3,430,041
FAR ULTRAVIOLET NON-DISPERSIVE ANALYZER UTILIZING RESONANT RADIANT ENERGY FROM THE PERIPHERY OF THE VAPOR CLOUD OF THE SOURCE
Wilbur I. Kaye, Fullerton, Calif., assignor to Beckman Instruments, Inc., a corporation of California
Filed Mar. 17, 1965, Ser. No. 440,536
U.S. Cl. 250—43.5                                    9 Claims
Int. Cl. G01n *21/26*

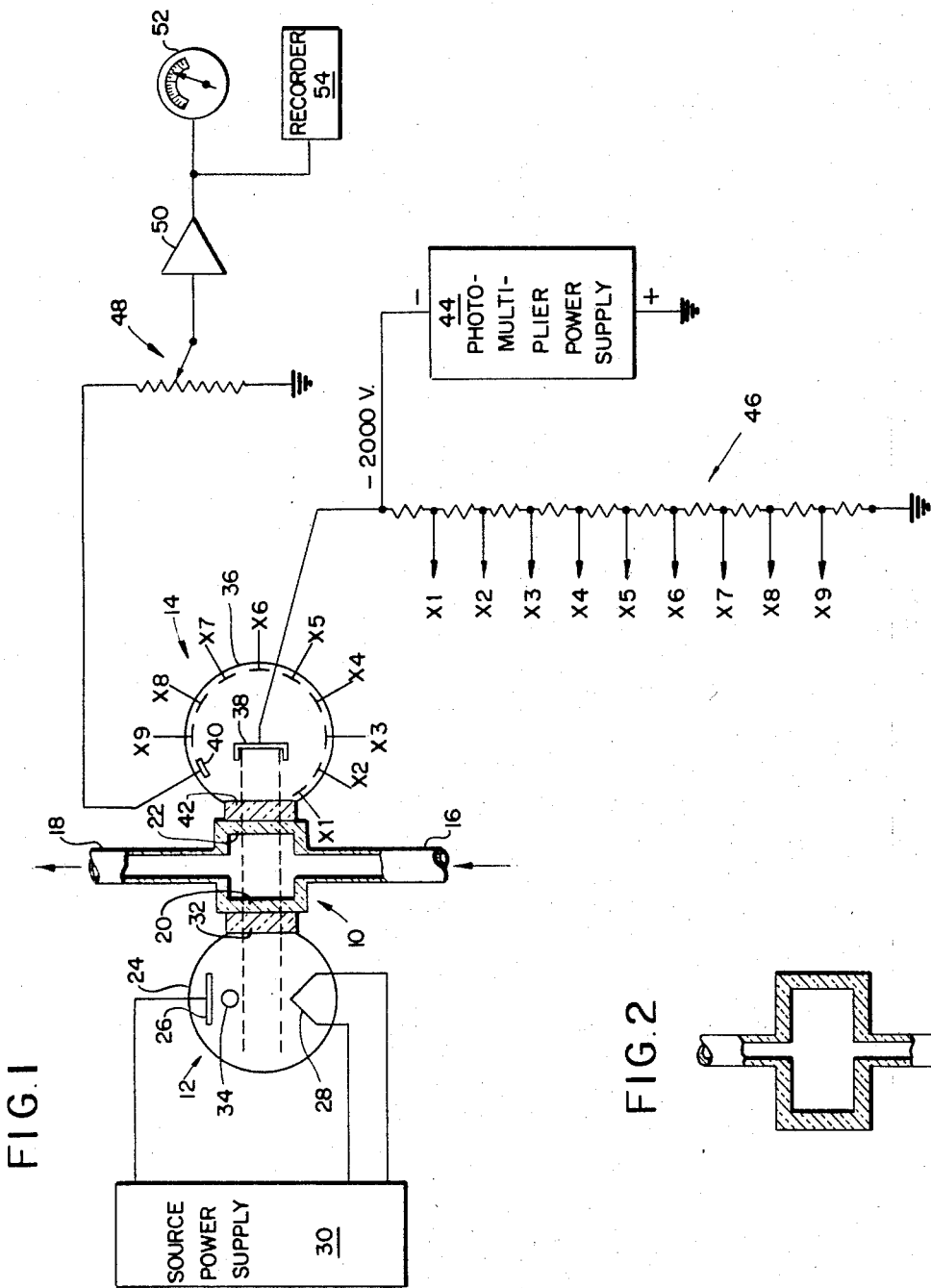

ABSTRACT OF THE DISCLOSURE

A far ultraviolet nondispersive analyzer is disclosed utilizing a source lamp and photomultiplier detector which are provided with flat windows transparent to the radiant energy region of interest. A sample cell, also having flat windows, is interposed between the source and detector in air tight relationship. The source and detector are arranged in such a way that only radiation from the periphery of the vapor cloud formed in the source lamp is focused upon the detector. The sample cell may be interchanged with similar sample cells having different lengths.

---

This invention relates, in general, to chemical analyzers and more particularly, to a non-dispersive radiant energy absorption analyzer operating in the far ultraviolet spectral region.

There is a current need for a simple, inexpensive, rugged, yet reliable instrument for the rapid determination and/or monitoring of chemical substances. By way of example, one area in which such requirement currently exists is the study of air pollution caused by automobile exhaust gases. The present invention, employing the ultraviolet absorption method of analysis, provides a monitoring instrument which not only fulfills the above need but which is additionally capable of general use. It appears to be especially useful in determining whether, and by how much, certain chemical substances, such as those found in a sample taken from the exhaust of an automobile, depart from an established standard.

Existing far ultraviolet absorption analyzers generally employ filters, lenses, and mirrors for obtaining the desired wavelength and for suitably focusing and directing the radiant energy. In addition, they require purging or evacuation to eliminate from the optical path oxygen and water vapor which absorb far ultraviolet radiation. As a result of their complexity and delicacy, these instruments are relatively expensive, require careful handling, and must be operated in a reasonably well protected and controlled environment. Also, most of these instruments provide only one sample cell which cannot be interchanged with other cells having different optical path lengths in order to obtain various sensitivities. Furthermore, because of the dispersion of the radiant energy emitted by the source, high noise levels and poor response are often encountered.

Accordingly, it is an object of the present invention to provide an improved non-dispersive far ultraviolet absorption analyzer which may be used to comparatively determine and/or monitor the composition of gases and liquids.

It is another object of the present invention to provide an improved far ultraviolt absorption analyzer which is simple, sensitive, and inexpensive, yet which is also rugged, reliable, of fast response and low noise level.

It is another object of the present invention to provide a non-dispersive far ultraviolet absorption analyzer whose band width is approximately 0.1 A. or less.

It is yet another object of the present invention to provide a non-dispersive far ultraviolet absorption analyzer in which the radiant energy path length and hence the sensitivity, may be varied.

It is a still further object of the present invent to provide a non-dispersive far ultraviolet absorption analyzer in which substantially no part of the optical path is exposed to the atmosphere (except for the atmosphere in the sample cell).

According to one specific, exemplary form of the present invention described and shown herein, there is provided a device comprising a source of radiant energy in the far ultraviolet spectral region such as a mercury lamp, a flow-through sample cell, a photomultiplier detector, and ancillary equipment such as power supplies, an amplifier, an indicator and a recorder. The envelopes of the source lamp and the photomultiplier detector are each provided with a "window," that is, a portion transparent to the radiant energy, having an outer surface which is ground flat. Similar windows are provided in two of the opposing walls of the sample cell. In the assembled form of the analyzer, the windows of the source lamp and the photomultiplier detector are held flat, in substantially airtight relation, against the opposing windows of the sample cell. As a result, substantially no part of the optical path passes through the ambient atmosphere. Purging or evacuation of the instrument to eliminate oxygen and water vapor is thereby made unnecessary.

In accordance with another important aspect of the invention, the source lamp and photomultiplier detector are mounted relative to each other so that th detector cathode "sees" only the periphery of the vapor cloud formed in the source lamp during operation, instead of the center of the cloud. It has been found that the periphery of the vapor cloud provides an almost noise-free, yet intense source of the mercury resonant radiations of 1849 A. and 2536 A. By using a photomultiplier detector, such as one with a nickel cathode, whose response curve peaks sharply near the 1849 A. line, a combination source and detector is created which operates almost exclusively at the 1849 A. wavelength with a band width of about 0.1 A. As a result, no filtering is necessary.

The sample cell, which is sandwiched between the source lamp and the photomultiplier detector, may be easily replaced by sample cells having different lengths. This interchangeability enables optical paths of various lengths to be used to provide a range of sensitivities.

The novel features which are believed to be characteristic of the invention are set forth with particularity in the appended claims. The invention itself, however, together with further objects and advantages thereof, can best be understood by reference to the following description taken in connection with the accompanying drawing in which:

FIG. 1 depicts, in schematic form, the analyzer of the present invention; and

FIG. 2 illustrates a second sample cell having a longer optical path than the cell of FIG. 1 which may be interposed between the source and detector of the analyzer of FIG. 1.

Turning now to the drawing, there is shown a flow-through sample cell 10 sandwiched between a low pressure, far ultraviolet mercury lamp source 12 and a photomultiplier detector tube 14. The sample cell 10, constructed of far ultraviolet fused silica, has an inlet tube 16 and an outlet tube 18 for conducting a gaseous or liquid sample to and from the sample cell. No special provisions are necessary to heat the sample cell to prevent a gas or vapor sample from condensing in the cell because the heat derived from the source lamp is adequate for this purpose. Formed in two of the opposing walls of the sample cell are windows 20 and 22, through which the radiant energy emitted from the source 12 passes to the photomultiplier detector 14. In the specific, exemplary embodiment described and shown, the windows 20 and 22 each measure about one centimeter square. The outer surfaces of the windows 20 and 22 are ground and polished to a flat, smooth finish. The sample cell optical path length, that is, the distance between the interior surfaces of windows 20 and 22, is chosen in accordance with the desired sensitivity for a particular sample and may be varied by substituting sample cells having different optical path lengths.

The mercury lamp source 12 comprises generally an envelope 24 fabricated of a material transparent to far ultraviolet radiation, an anode 26 and a cathode 28, and is energized by a suitable power supply 30. Formed in the envelope 24 of the lamp 12 is a window 32 of far ultraviolet fused silica or the like having a plane exterior surface adapted to be held flat against the window 20 of the sample cell 10. During operation of the lamp 12, a mercury vapor cloud is formed, the center of which is symbolized by the sphere 34.

The photomultiplier detector tube 14 consists of an envelope 36 which may be of material similar to that of source envelope 24, a cathode 38, a string of nine dynodes X1–X9 and an anode 40. The cathode may be fabricated of any metal or compound which emits electrons when illuminated with far ultraviolet, and not near ultraviolet, radiant energy. Examples of metals which may be used are nickel and platinum. Copper oxide and metallic iodides are examples of compounds having suitable photoemissive properties.

The detector 14 is constructed so that the cathode 38 can receive a beam of radiant energy from the source approximately one centimeter in diameter. The beam is shown by the dotted line in the drawing. It will be observed that the beam originates in the peripheral region to one side of the center of the source vapor cloud. Formed in the envelope 36 is a window 42 similar to the window 32 in the envelope of the mercury lamp source 12. The detector 14 is mounted so that the window 42 is held flat against the window 22 of the sample cell path.

Power is supplied to the detector 14 by a power supply 44 and a voltage divider 46. The anode 40 of the photomultiplier detector 14 is connected to a variable load resistor 48, the output of which is connected to the input of an amplifier 50. The amplifier output, which is a function of the amount of radiant energy transmitted through the sample medium at a particular time, is simultaneously displayed on a meter 52 and recorded by a recorder 54. The variable load resistor 48 functions to establish the 100% or full scale position of the meter 52 and the recorder 54 when a non-absorbing reference gas is passed through the sample cell 10.

It will be obvious to those skilled in the art that various modifications may be made to the specific, exemplary embodiment of the invention described. While a particular embodiment has been discussed, it will be understood that the invention is not limited thereto and that it is contemplated to cover any such modifications as fall within the true spirit and scope of the invention by the appended claims.

What is claimed is:
1. An analyzer comprising:
a radiant energy source lamp having a flat window, said source lamp producing a vapor cloud the periphery of which emits at least one narrow band of resonant radiant energy;
a sample cell having a pair of opposed, flat windows;
a detector having a flat window;
said sample cell being removably positioned between said source lamp and said detector in substantially air-tight relation, said source lamp and said detector windows being held flat against said opposed sample cell windows, said detector receiving radiant energy exclusively from said periphery.
2. The analyzer of claim 1 in which
said sample cell is of the flow-through type and is interchangeable with other sample cells having different radiant energy path lengths.
3. The analyzer of claim 2 in which
said source lamp is a low-pressure mercury lamp producing said resonant radiant energy in the far ultraviolet spectral region.
4. The analyzer of claim 3 in which
said detector is a photomultiplier detector comprising a cathode, a string of dynodes and an anode, said detector having a response which peaks approximately at the wavelength of said resonant radiant energy emitted from said periphery of said source vapor cloud.
5. The analyzer of claim 4 in which
said detector has an output connected to a recorder through a variable load resistor.
6. An analyzer comprising:
a sample cell having a given optical path length;
a mercury lamp source producing during operation a mercury vapor cloud having a peripheral portion which emits radiant energy having at least one substantially noise-free resonant wavelength in the far ultraviolet region of the electromagnetic spectrum, said lamp having an envelope with a portion transparent to said resonant wavelength, said transparent portion of said source lamp envelope removably adjoining said sample cell in substantially air-tight relation;
a detector having a response peaking substantially at said resonant wavelength, said detector having an envelope a portion of which is transparent to said resonant wavelength, said transparent portion of said detector envelope removably adjoining said sample cell in substantially air-tight relation, said sample cell, said detector and said mercury lamp source being positioned relative to one another so that said detector receives radiation exclusively from said peripheral portion of said mercury vapor cloud after passage through said sample cell.
7. The analyzer of claim 6 in which
said sample cell is interchangeable with other sample cells of various optical path lengths whereby the sensitivity of said analyzer may be varied.
8. The analyzer of claim 7 in which
said sample cell has a pair of opposed, flat windows;
said transparent portions of said source lamp envelope and said detector envelope comprise flat windows; and,
said sample cell is sandwiched between said source lamp and said detector in substantially air-tight relation, said source lamp and said detector windows being held flat against said opposed sample cell windows.
9. The analyzer of claim 8 in which
said detector has an output connected to a recorder through a variable load resistor.

References Cited
UNITED STATES PATENTS

| 2,934,647 | 4/1960 | Blake | 250—43.5 |
| 3,067,327 | 12/1962 | Scott et al. | 250—43.5 |
| 3,105,147 | 9/1963 | Weilbach et al. | 250—43.5 |
| 3,161,769 | 12/1964 | McPherson | 250—43.5 |

WILLIAM F. LINDQUIST, *Primary Examiner.*

U.S. Cl. X.R.
88—14